United States Patent [19]

Hoskin et al.

[11] Patent Number: 4,785,883

[45] Date of Patent: * Nov. 22, 1988

[54] POLYSILICATE ESTERS FOR OIL RESERVOIR PERMEABILITY CONTROL

[75] Inventors: Dennis H. Hoskin, Lawrenceville, N.J.; Louis D. Rollmann, Dallas, Tex.

[73] Assignee: Mobil Oil Corporation, New York, N.Y.

[*] Notice: The portion of the term of this patent subsequent to Apr. 28, 2004 has been disclaimed.

[21] Appl. No.: 940,305

[22] Filed: Dec. 10, 1986

Related U.S. Application Data

[63] Continuation-in-part of Ser. No. 697,098, Feb. 1, 1985, Pat. No. 4,660,640.

[51] Int. Cl.$^4$ .................... E21B 33/138; E21B 43/24
[52] U.S. Cl. ................................ 166/270; 166/272; 166/294; 166/295; 166/300
[58] Field of Search ............... 166/270, 292, 294, 295, 166/300, 272; 405/263, 264

[56] References Cited

U.S. PATENT DOCUMENTS

| | | | |
|---|---|---|---|
| 2,259,875 | 10/1941 | Bent et al. | 166/294 X |
| 2,281,810 | 5/1942 | Stone et al. | 166/294 |
| 2,618,570 | 11/1952 | Blackburn | 405/264 |
| 2,747,671 | 5/1956 | Nowak et al. | 166/295 |
| 2,816,610 | 12/1957 | Fisher | 166/270 X |
| 3,626,699 | 12/1971 | Lees | 405/263 |
| 3,811,508 | 5/1974 | Friedman | 166/288 |
| 4,009,755 | 3/1977 | Sandiford | 166/270 |
| 4,069,869 | 1/1978 | Sandiford | 166/270 |
| 4,275,789 | 6/1981 | Lawrence et al. | 166/294 |
| 4,413,680 | 11/1983 | Sandiford et al. | 166/270 |
| 4,417,623 | 11/1983 | Anthony | 166/294 |
| 4,673,038 | 6/1987 | Sandiford et al. | 166/295 X |

OTHER PUBLICATIONS

Production Report, *The Oil and Gas Journal*, Mar. 25, 1974, pp. 69–78.

*Primary Examiner*—George A. Suchfield
*Attorney, Agent, or Firm*—Alexander J. McKillop; Michael G. Gilman; Stanislaus Aksman

[57] ABSTRACT

The permeability of subterranean oil-bearing formations is controlled by injection of an organic polysilicate ester. The ester may be derived from simple, monohydroxylic alcohols such as methanol, ethanol, propanol or butanol, from diols such as ethylene glycol, from polyols such as glycerol and alkylene oxide polymerization products and from other organic compounds containing functional hydroxy groups, for example, partial ethers and esters of glycols and polyols. The polysilicates are injected into a formation through injection wells, suitably in an amount from 10 to 100% of the pore volume of the zone to be treated. In the formation, the polysilicate esters form gels which selectively decrease the permeability of the high permeability regions of the formation, to divert the flow of flooding liquid used in flooding operations to the less permeable regions of the formation.

19 Claims, No Drawings

POLYSILICATE ESTERS FOR OIL RESERVOIR PERMEABILITY CONTROL

CROSS-REFERENCE TO RELATED APPLICATIONS

This application is a continuation-in-part of a pending U.S. patent application Ser. No. 697,098, filed on Feb. 1, 1985, now U.S. Pat. No. 4,660,640, the entire disclosure of which is incorporated herein by reference.

FIELD OF THE INVENTION

This invention relates to the control of permeability in subterranean oil-bearing formations.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced so as to improve the displacement of the oil from the reservoir. The use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried but vertical communication among reservoir strata often renders such measures ineffective. Physical plugging of the high permeability zones by cements and solid slurries has also been attempted with varying degrees of success but here, one serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This has led to the use of oil/water emulsions, gels and polymers for controlling the permeability of the formations in a process frequently referred to as "profile control", a reference to the control of the vertical permeability profile of the reservoir. Profile control agents which have been proposed have included oil/water emulsions, gels, e.g. lignosulfonate gels and polymers, with polymers being the most extensively applied in recent years.

Profile control agents are also used to control the permeability of the high permeability regions in conjunction with miscible displacement or thermal processes of enhanced oil recovery (EOR), such as nitrogen and carbon dioxide flooding or steam flooding.

Among the polymers so far examined for controlling the permeability of the high permeability regions are polyacrylamides, polysaccharides, celluloses, furfuralalcohol and acrylic/epoxy resins, silicates and polyisocyanurates, as described, for example, in U.S. Pat. Nos. 4,009,755, 4,069,869 and 4,413,680. These organic polymers may be used in either their uncrosslinked forms or as crosslinked metal complexes, e.g. as described in the patents previously mentioned.

One problem which has persisted with the use of the various organic polymers as permeability control agents is that their stability may not be wholly satisfactory at all the elevated temperatures commonly encountered in oil-bearing formations. There is therefore a continuing need for materials which will block the high permeability regions of oil-bearing formations over an extended range of temperatures, particularly in reservoirs which are at a high temperature.

Proposals have been made for the use of inorganic polymers, especially silicates, as permeability control agents and proposals have been made for the use of inorganic silicates in this way. For example, U.S. Pat. Nos. 4,009,755 and 4,069,869 disclose the use of inorganic silicates for this purpose. In the permeability control method described in these two patents, an organic polymeric permeability control agent such as a crosslinked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid forming compound such as a water soluble ammonium salt, a lower aldehyde, an aluminum salt or an alkaline metal aluminate.

The problem, however, with many inorganic silicates is that their solutions are often quite viscous and stable only under alkaline conditions. As soon as conditions approach non-alkalinity, silicate gel is formed. Although this is the desired reaction for plugging the formation, it may occur prematurely, before the solution has had an adequate opportunity to enter the high permeability regions of the formation, cutting off the possibilities for further injection of plugging material. This is obviously undesirable and it would represent a distinct improvement if the silicates could be made more stable under a wider range of pH conditions. The use of silica sols has been considered but these often contain particles with diameters in excess of 10 microns, too large to penetrate many reservoir rock pores.

SUMMARY OF THE INVENTION

It has now been found that organic polysilicate esters are suitable materials for the control of permeability in subterranean, oil-bearing formations. These polysilicates offer a small, reproducible silica "particle" size in the sense that it is possible to produce polysilicates which do not contain gel particles larger than a predetermined size; they have a controlled gelation period which is adequately long for proper placement in the reservoir; they are stable under a wide range of conditions and temperature and pH. In many cases, their solutions have a satisfactorily low viscosity, enabling them to be injected into the formation without the use of excessive injection pressures.

According to the present invention, therefore, a method for controlling the permeability of a subterranean, oil-bearing formation employs an organic polysilicate ester which is injected into the formation where it enters the regions of high permeability to decrease the permeability of the high permeability regions. In some formations and under some circumstances, the organic polysilicate ester may substantially completely block the high permeability region or regions, e.g., due to the formation of a siliceous plug. After the injection of the polysilicate ester is completed, the oil is recovered by secondary recovery, miscible displacement or thermal processes.

DETAILED DESCRIPTION OF THE INVENTION

Methods for the control of permeability in subterranean, oil-bearing formations are used in conjunction with secondary recovery methods, and miscible displacement or thermal EOR processes, conducted to recover oil from the formation. The secondary recovery methods are flooding operations utilizing a flooding liquid, usually water, injected into the formation through injection well or wells which extend from the surface of the earth into the formation. The miscible EOR displacement processes include nitrogen flooding, carbon dioxide flooding and hydrocarbon flooding. The thermal EOR processes include oxygen fireflooding and steam flooding.

In the secondary recovery method flooding operation, the flooding liquid displaces the oil from the formation towards a production well which is situated at a horizontal distance or offset from the injection well. In practice, a number of injection and production wells will be used in a given field, arranged in conventional patterns such as a line drive, five spot or inverted five spot, seven spot or inverted seven spot. Because the flooding liquid will tend to pass preferentially through the high permeability regions and leave the low permeability or "tight" zones unswept, it is desirable to plug the high permeability regions and any fractures which may be present with the permeability control agent. This is done by injecting the permeability control agent through the injection well in a slug, to decrease the permeability of the high permeability regions. Without wishing to be bound by any theory of operability, it is thought that the permeability control agent forms a gel-like precipitate or plug in the formation which decreases the permeability of the high permeability regions and diverts the flooding liquid to the less permeable zones, to displace the oil from them. The plug should, of course, have adequate stability, both in terms of mechanical strength, since it is necessary for the plug to resist the pressures which will be applied during the subsequent flooding step by the injection of the flood liquid, and in terms of chemical stability under the reservoir conditions which are encountered. In addition, a selected permeability control agent must be capable of being injected into the reservoir through the injection well and this means that it must be capable of being pumped through the equipment which is available.

According to the present invention, the permeability control agents which may be used are the polysilicate esters of organic alcohols and other organic compounds containing functional hydroxyl groups. Thus, the polysilicate esters may be esters of simple alcohols, such as methyl, ethyl, n-propyl, iso-propyl, n-butyl, sec-butyl, tert-butyl, with polyols, such as ethylene glycol, 1,2-propylene glycol, 1,3-propylene glycol or higher glycols and higher polyols such as glycerol. Polymeric alcohols may also be used to form the esters, for example polyvinyl alcohol and polymeric alkylene oxides with terminal hydroxyl groups. Other organic compounds which contain functional hydroxyl groups may also be employed, for example, alkanolamines such as monoethanolamine, diethanolamine and triethanolamine and the partial ethers and esters of glycols and higher polyols, for example, hydroxyl-containing alkoxy ethers and alkanoletherates such as the monoalkylethers of ethylene glycol, e.g. ethylene glycol monomethyl ether, 2-(2-methoxyethoxy)ethanol, ethylene glycol monoethyl ether, ethylene glycol monobutyl ether, ethylene glycol monohexyl ether and ethylene glycol monophenyl ether, which are commercially available under the "Cellosolve" trademark. Internal alcohols, such as the ethoxylated alcohols, e.g. ethoxylated glycols and glycerols and epichlorohydrin derivatives and glycol oligomers, may also be used.

The polysilicate esters may be conveniently produced by reacting the selected hydroxyl group-containing compound with an acidified solution of an alkali metal silicate, usually sodium silicate. Solutions of this kind may be regarded as solutions of polysilicic acid, the degree of polymerization depending upon the composition of the original silicate solution and the acidification conditions employed, particularly the rate of acidification. The alkali metal silicates are used in the form of aqueous solutions of the silicate, commonly available as "water glass". These solutions may be of varying composition, depending upon the $Na_2O:SiO_2$ ratio of the silicate. Generally, this ratio will vary within the range of 2:1 to 1:3.75 (molar, as oxide), determined by the ratio of soda ash to silica used in the production of the silicate. For the present purposes, it is generally preferred to use less viscous silicate solutions of somewhat higher $Na_2O:SiO_2$ ratio as these produce esters which are more readily injected into a formation but which still generate adequate gel strength once correct placement within the high permeability regions of the formation has been achieved.

The solution of the alkaline metal silicate is acidified using an acid or an acid-forming reagent, preferably a mineral acid, for example, sulfuric acid, hydrochloric acid or nitric acid. Acidification is generally carried out under ambient conditions or with cooling, and with vigorous stirring to prevent the formation of a solid silica gel. Generally, the acidification will be carried out to pH values of 4.0 or lower, more usually 3.0 or lower. This will form a somewhat viscous solution which is then reacted with the desired alcohol to form the appropriate ester. Generally, reaction with the alcohol takes place readily with mild heating, to remove water and to drive the reaction to completion.

In addition, a transesterification may be used if a polysilicate ester is initially available; in this process, a compound containing hydroxyl (alcohol) functionality is reacted with the initial polysilicate ester to effect an interchange of the organic groups. Polysilicate esters of varying molecular weight can also be produced by the controlled oligomerization and/or hydrolysis of an orthosilicate or of a polysilicate of lower molecular weight than the final desired polysilicate ester.

These and other methods of preparing the polysilicate esters are described in "The Chemistry of Silica", R. K. Iler, John Wiley & Sons, N.Y., 1979, to which reference is made, in its entirety, for a detailed description of such methods.

The resultant polysilicate esters may undergo reversible shear thinning during injection into the formation depending on their molecular weight, concentration and structure, and this property may be exploited in the placement of the slug of polysilicate ester, aided by the pressure gradient around the injection well. Around an injector, the flow rate and the associated pressure gradient are at a maximum; they drop off rapidly with radial distance from the wellbore. Thus, an injected polysilicate with non-Newtonian rheology will flow outwards from the injector. Its apparent viscosity will be initially low because of the high shear conditions which prevail in this region and hence the slug can be readily injected. At a location sufficiently far away from the injection well, e.g., 10 m, the flow rate and pressure gradient are much reduced and the viscosity returns to its low shear, high volume. This increased viscosity arrests and in some instances may halt the movement of the polysilicate ester, which may have the physical form of the slug. The polysilicate then forms the final polymeric gel, partially or completely blocking the regions of high permeability. However, the initial polysilicate may have a significant viscosity or may contain gel particles of a size which is comparable to that of the pores in the less highly permeable zones. Entry into these tight regions of a formation will then be prevented. Thus, selective placement of the polysilicate into the more highly permeable regions would be ensured.

If desired, gel formation may be induced by injection of pH-altering or other coagulating materials, such as brines containing in particular, fluoride or phosphate ions. In general, a modest upwards pH adjustment will accelerate gel formation. These materials may be included in the polysilicate slug or may precede or follow it into the formation.

In general, the amount of the polysilicate which is injected into the formation may be, for example, from about 10% to about 100% of the pore volume of the high permeability regions whose permeability is to be reduced or which are to be selectively plugged. The injected fluid may be proportioned into the various reservoir strata according to their effective permeabilities and flow capacities. The concentration of the polysilicate ester in the injected fluid will generally be from 10 weight % to 100 weight %, preferably at least 50 weight %. Aqueous solutions of the esters are preferred when solutions are used.

After the polysilicate ester injection is completed, the oil is recovered from the formation by injecting a flooding liquid into the formation, or by subjecting the formation to conventional miscible displacement or thermal processes of oil recovery. The flooding operation is discussed above. In miscible displacement processes, the formation is subjected to nitrogen flooding, carbon dioxide ($CO_2$) flooding at the conditions at which the $CO_2$ is miscible in the formation oil or to hydrocarbon flooding. Nitrogen flooding is conducted by injecting a gas mixture, comprising predominantly nitrogen ($N_2$), into the formation under high pressure to form a miscible region between the gas and oil regions.

In carbon dioxide flooding, $CO_2$ is injected into the reservoir to dissolve in the crude oil, swell it and reduce its viscosity. Slugs of water may be alternated with the $CO_2$ to control miscibility and to sweep the oil to the producing wells.

In hydrocarbon flooding, a hydrocarbon slug, usually light hydrocarbons in liquid form, e.g., liquefied petroleum gases, such as propane, butane and ethane, is injected into the producing formation to dissolve the reservoir oil and reduce its viscosity and reduce the capillary forces between the oil and the reservoir rock. A subsequent injection of a "chase" gas moves the oil towards the production well.

In thermal oil recovery processes, the oil is recovered by air or oxygen fireflooding, cyclic steam stimulation or by steam flooding.

The oxygen fireflooding involves the injection of oxygen into the formation and the initiation of the in-situ combustion of the heavy oil fractions by any suitable means, e.g., by lowering a heater or introducing heated air into the formation. Oxygen is injected to sustain the combustion front and water may be added to scavenge heat left in the burned zones. As the burning zone advances, $CO_2$ absorption and heat reduce the oil viscosity, thereby enabling it to flow more readily towards the production well.

In cyclic steam stimulation, also referred to as the "huff and puff" method, steam is injected into the well (huff or the injection phase); the well is shut-in to allow the dissipation of heat in the oil (soak or the shut-in phase); and, after a selected time period, the well is converted into a production well (puff or the production phase).

Steam flooding is similar to the water flooding, except the steam is injected into the producing formation from several steam injection wells and condenses upon contact with the cooler portions of the formation, e.g., rock or sands. The resulting hot water contacts the oil and reduces its viscosity, enabling it to flow more readily through the formation into the producing wells.

The details of the miscible displacement and thermal processes are known to those skilled in the art from a number of previously-published articles and patents, e.g. Stalkup, Jr. "Miscible Displacement," First Printing, Henry L. Doherty Memorial Fund of AIME, Society of Petroleum Engineers of AIME, New York, Dallas (1983); Stalkup, "Carbon Dioxide Miscible Flooding: Past, Present and Outlook for the Future", *JOURNAL OF PETROLEUM TECHNOLOGY*, August 1978, pages 1102-1112. Exxon Background Series, "Improved Oil Recovery", December 1982; Marx, U.S. Pat. No. 2,813,583; Koch et al., U.S. Pat. No. 3,036,632; Clossmann et al., U.S. Pat. No. 3,221,813; Allen, U.S. Pat. No. 4,068,716; McCorquodale, U.S. Pat. No. 4,333,529; and Prats, "A Current Appraisal of Thermal Recovery", *JOURNAL OF PETROLEUM TECHNOLOGY*, August 1978, pages 1129-1136. The entire contents of all of the aforementioned patents and publications are incorporated herein by reference.

The invention is illustrated by the following Examples:

EXAMPLE 1

This Example illustrates the preparation of butyl polysilicate, by the procedures described in Indust. and Eng. Chem., Vol. 39, pages 1379-1384 (1947).

A solution of 388.5 g. sodium silicate (28.4% $SiO_2$, 8.7% $Na_2O$) in 569 g. water was added to cold, vigorously stirred sulfuric acid (855 ml., 7.35% strength) over a period of 10 minutes during which the temperature rose from 12° to 17° C. The pH of the mixture at the end of the addition was 1.67.

A quantity (678 ml) of tert-butanol was then added. The temperature increased to 22° C. After cooling to 20° C., a virtually clear liquid was obtained. After adding 509 g. of NaCl, two phases separated. The upper phase was isolated and distilled with the continuous addition of n-butanol at a pressure of 30 torr (4 kPa) with pot temperatures ranging initially from 27.5° to 60° C. final. A total of 850 ml n-butanol was added and a total 1735 ml of alcohol and water was removed during the course of the distillation.

The t-butanol-free product was filtered through a coarse glass frit to yield 490 ml of a slightly cloudy liquid from which 17 gram of residue was removed by filtration. The remaining liquid was then distilled at atmospheric pressure in the presence of additional butanol at a final pot temperature of 115° to 119° C. After further filtration, the final butyl polysilicate product (397 g, 35.8%) was obtained as a solution in n-butanol.

EXAMPLE 2

This Example shows that the butyl polysilicate of Example 1 is a submicron silica species.

The butyl polysilicate liquid of Example 1 was passed first through a 1.0 and then a 0.6 micron Nucleopore (trademark) filter. In neither case was any observeable amount of material retained. The fresh material analyzed at 35% butyl polysilicate after removal of excess butanol at 150° C., the material which passed through the 1.0 micron filter, 35%, and that through the 0.6 micron filter, 34%.

EXAMPLE 3

This Example shows that the butyl polysilicate possesses sufficient temperature stability to permit injection into a subterranean reservoir formation.

Equal weights of the butyl silicate liquid of Example 1 and water were mixed and allowed to stand at 50° C. for varying lengths of time. After 17 hours, the filtrate through a 0.6 micron filter analyzed at 30% butyl polysilicate and after 38 hours, 28%. A gel was observed at 106 hours. Virtually the same results were obtained when water was replaced by a 22% NaCl/CaCl$_2$/MgCl$_2$ brine (wt. ratio 8.16/2.27/1.0). After 17 hours, the filtrate analyzed at 30% solids, after 38 hours, 30% solids and a gel had formed at 106 hours. In a third experiment when a phosphate buffer solution having a pH of 7 was substituted for brine, a gel formed in two to four hours.

EXAMPLE 4

This Example shows that a polysilicate ester solution can be easily concentrated.

The butyl polysilicate solution (150 g) of Example 1 was subjected to vacuum at room temperature and 65 g of n-butanol was removed overhead. The product was a very pale yellow, relatively low viscosity fluid containing 60% ester. In a separate experiment 1.59 g of the initial butyl polysilicate solution was evaporated just to dryness at 145° C., one atmosphere. The resultant very viscous fluid was soluble in acetone, indicating no degradation to SiO$_2$.

EXAMPLE 5

This Example shows that other alcohols can replace n-butanol in the synthesis.

To 204 g of the t-butanol phase of Example 1 were added 204 g of 2-(2-methoxyethoxy)ethanol (MEE) and 1 g BaCl$_2$. The butanol was distilled off under vacuum, beginning at room temperature. Another 100 g of MEE was added and distillation continued at 80° C., at about 2 mm pressure. A small amount of Filteraid (trademark) was added and the mixture was filtered to yield 294 g of light yellow liquid. The product was completely miscible with water, indicating the formation of the desired ethoxylated polysilicate ester.

EXAMPLE 6

This Example shows the need for alcohol functionality.

The essential procedures of Example 5 were repeated except that 2-methoxyethyl ether was used in place of MEE. As the distillation temperature reached 50°-60° C., solid SiO$_2$ began to deposit out of solution. The ether could not form an ester and therefore could not stabilize the polysilicic acid species formed as the t-butanol was removed.

EXAMPLE 7

This Example shows that the degree of esterification may alter the stability of polysilicates towards gelation.

The butylpolysilicate of Example 1 was 35.8% solids and analyzed as 51.08% C, 10.74% H, 10.55% O, and 22.7% SiO$_2$ (95.07% total; the O analysis being probably low). Correcting for the n-butanol solvent, this analysis corresponds to an alkyl:silica mole ratio of 0.56.

A commercially available polyethylsilicate (Polysciences, MW reported as 744 g. mole$^{-1}$) analyzed 34.46% C, 7.40% H, 8.34% O and 49.2% SiO$_2$, corresponding to an ethyl:silica ratio of 1.75.

The difference in degree of esterification is considered important in the observation that the butyl ester gelled in 2-4 hours at 50° C. with an equal volume of a pH 7 phosphate buffer while the polyethylsilicate with Et/Si=1.75 required 20-23 hours at 90° C. with the same buffer (the polyethylsilicate was fluid after 20 hours, a loose gel after 23 hours and a solid gel after 42 hours). The butylpolysilicate preparation, on the other hand, formed a solid gel in about 0.5 hours under these conditions (phosphate buffer, 90° C.).

EXAMPLE 8

This Example describes another trans-esterification procedure for the preparation of various polysilicates.

A mixture of the polyethylsilicate of Example 7 (46 g), 2-(2-methoxyethoxy)ethanol (MEE, 50.8 g) and p-toluenesulfonic acid (0.11 g) was heated over about four hours from ambient temperature to 165° C. with concurrent ethanol distillation (18.2 g). The product liquid, unlike the starting polyethylsilicate, readily dissolved in water. An attempt to remove any excess MEE by stripping in vacuo yielded only 0.16 g of material overhead, indicating virtually complete reaction. In support of this assertion was the molar equivalency of MEE added (0.42 moles) to ethanol distilled over during reaction (0.40 moles). The $^{13}$C-NMR spectrum confirmed that the polysilicate ester contained 64% 2-(2-methoxyethoxy)ethoxy and 36% ethoxy sidechains.

EXAMPLE 9

This Example shows that the butyl polysilicate of Example 1 is capable of impeding flow when injected into a high permeability, unconsolidated sandstone.

A column (9 mm i.d., length 61 cm) was packed with 40-325 mesh (U.S. Standard) Berea sandstone, instrumented for pressure measurement at both ends of the column and for fluid flow and placed in a temperature bath at 50° C. After filling the column with the 22% brine solution used in Example 3, the sandpack permeability was about 4 darcy. At a brine flow rate of 4.5 cc. hr$^{-1}$ (12 ft/day) the pressure drop was 2.76 kPa (0.4 psi). One pore volume of the butyl polysilicate solution of Example 1 was injected, followed by 0.1 pore volumes of brine and the flow was then halted for 16 hours in order to permit adequate time for the gel to form. On injecting the polysilicate, the pressure drop decreased to 0.7 kPa (0.1 psi). After the 16 hour holding period, flushing with brine was resumed for several hours and the procedure was then repeated, except that following injection of the second slug of polysilicate solution, flow was halted over a weekend. At the start of the second polysilicate injection, the pressure drop was 4.1 kPa (0.6 psi) which increased to 27.6 kPa (4 psi) as the system was returned to brine. After the weekend, on resuming brine flow, the pressure drop was 96 kPa (14 psi) at a flow rate of 4.5 cc. hr$^{-1}$ and 13.8 kPa (2 psi) at a flow rate of 0.4 cc. hr$^{-1}$ (flow rates equivalent to 12 and 1 ft/day respectively).

EXAMPLE 10

This Example shows that the alcohol substituent affects the flow inhibiting properties of the polysilicate ester.

In addition to the comparison reported in Example 7 between the ethyl and butyl polysilicates, a comparison was made which showed that flow inhibition in a sandpack required much longer with the polyethyl than with the polybutylsilicate. A sandpack like that of Example 9 was filled with 22% brine solution. One pore volume of the polyethylsilicate ester was injected and flow was halted for 64 hours. A pressure drop of about 13.8 kPa (2 psi) was observed upon subsequent injection of several pore volumes of brine. After an additional 0.5 PV of polyethylsilicate was injected and shut in for 24 hours, a pressure drop in excess of 207 kPa (30 psi) was observed (12 ft/day brine).

EXAMPLE 11

This Example shows that the gelling properties of the polysilicate esters can be altered by aging.

The procedures of Example 9 were repeated except that the butylpolysilicate had been aged at room temperature about 9 weeks after preparation. On injection, a pressure drop of about 13.8 kPa (2 psi) developed almost immediately. After a two hour shut-in period, brine injection at 12 ft/day resulted in a pressure drop in excess of 207 kPa (30 psi), much greater than that observed in Example 9 with freshly-prepared material. The explanation probably involves an increase in the polysilicate molecular weight for this partially substituted ester. Incidental contact with water may have also contributed.

When the procedures were repeated at 75° C., with a butylpolysilicate that had been aged about 6 weeks, the sandpack pressure drop reached 62 kPa (9 psi) after about 0.5 PV of the ester had been injected. After the injection of 1 PV total polysilicate, the sandpack was shut in for 16 hours. A 22% brine was then injected at 12 ft/day. The pressure drop exceeded 207 kPa (30 psi).

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of controlling the permeability of a subterranean, oil-bearing formation comprising the following steps:
   (i) acidifying an aqueous solution of an alkali metal silicate;
   (ii) reacting the product of step (i) with an organic, hydroxyl group-containing compound;
   (iii) injecting the polysilicate product of step (ii) into the high permeability region or regions of the formation to decrease the permeability thereof;
   (iv) injecting into the formation a flooding liquid or subjecting the formation to miscible displacement or thermal oil recovery processes; and
   (v) recovering the oil from the formation.

2. A method of claim 1 wherein a siliceous gel is formed in the high permeability region or regions.

3. A method of claim 2 wherein in said step (iv) the flooding liquid is injected into the formation.

4. A method according to claim 3 wherein the flooding liquid is water.

5. A method according to claim 4 wherein the alkali metal silicate is sodium silicate.

6. A method according to claim 5 in which the organic, hydroxyl group-containing compound comprises an aliphatic monohydroxylic alcohol.

7. A method according to claim 6 wherein the aliphatic monohydroxylic alcohol is methyl, ethyl, n-propyl, iso-propyl, n-butyl, sec-butyl, or tert-butyl alcohol.

8. A method according to claim 7 wherein the aliphatic monohydroxylic alcohol is n-butyl alcohol.

9. A method according to claim 1 wherein the flooding liquid is water.

10. A method according to claim 9 in which the organic, hydroxyl group-containing compound comprises an aliphatic diol.

11. A method according to claim 9 in which the organic, hydroxyl group-containing compound comprises a polyol.

12. A method according to claim 9 in which the organic, hydroxyl group-containing compound comprises an alkoxy ether.

13. A method according to claim 9 in which the polysilicate product injected into the formation is used in an amount equivalent to 10 to 100% of the pore volume of the zone to be treated.

14. A method according to claim 1 wherein in said step (iv) the formation is subjected to the miscible displacement oil recovery process.

15. A method according to claim 14 wherein the miscible displacement oil recovery process is nitrogen flooding, carbon dioxide flooding or hydrocarbon flooding.

16. A method according to claim 15 wherein the miscible displacement oil recovery process is carbon dioxide flooding.

17. A method according to claim 1 wherein in said step (iv) the formation is subjected to thermal oil recovery processes which are oxygen fireflooding, cyclic steam stimulation or steam flooding.

18. A method according to claim 17 wherein the thermal oil recovery process is steam flooding.

19. A method according to claim 18 wherein the thermal oil recovery process is oxygen fireflooding.

* * * * *